Figure 1:
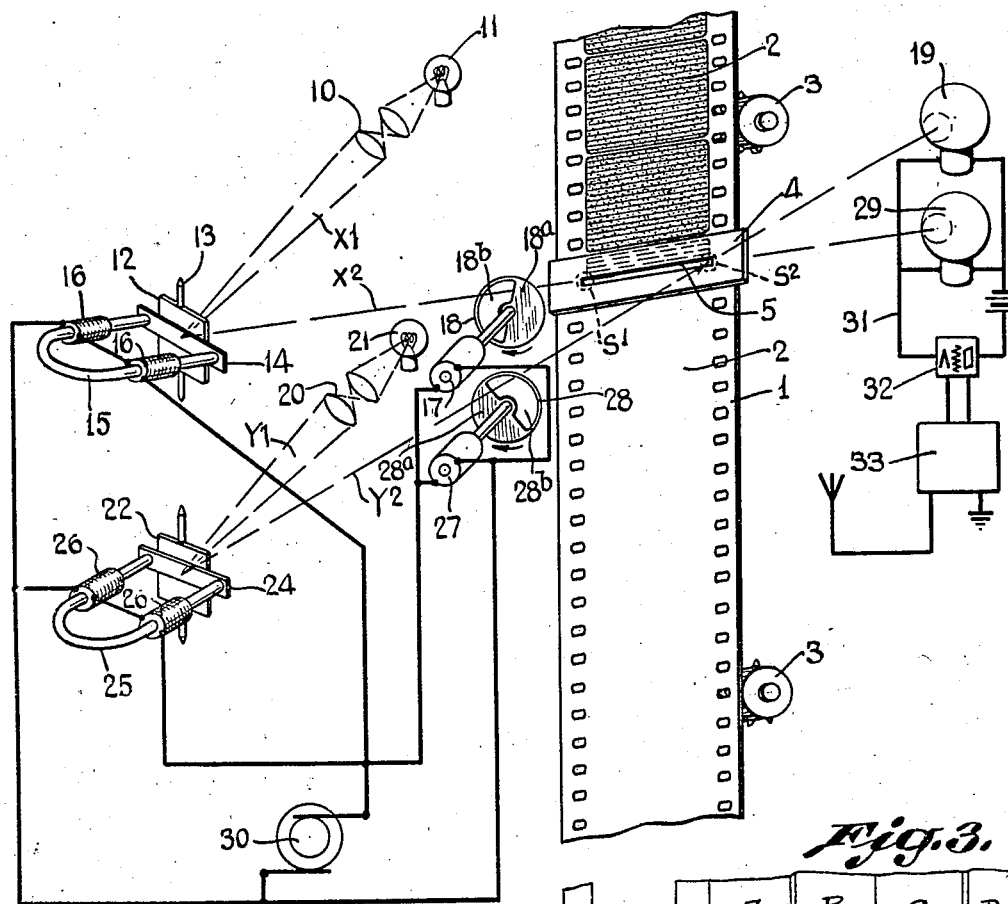

May 28, 1935.  O. A. ROSS  2,002,678

METHOD OF SCANNING AND APPARATUS THEREFOR

Filed Dec. 9, 1930

INVENTOR.
Oscar A. Ross.
BY O. A. Ross.
ATTORNEY

Patented May 28, 1935

2,002,678

UNITED STATES PATENT OFFICE 2,002,678

METHOD OF SCANNING AND APPARATUS THEREFOR

Oscar A. Ross, New York, N. Y.

Application December 9, 1930, Serial No. 501,026

10 Claims. (Cl. 178—6)

This invention refers to television broadcasting and more particular to that phase of television broadcasting wherein the picture to be transmitted is scanned by a beam of light.

In the broadcasting of television motion pictures a present method of scanning the film comprises in directing a beam of light onto a vibrating mirror arranged to project the reflected beam onto the film in a sinusoidal path, the beam moving constantly from one side of the film to the other as the film is advanced. If the beam is made sufficiently narrow, and the film is moved sufficiently fast to prevent superimposed scanning as the film advances, a comparatively large area of the picture remains unscanned whereas if the beam is made sufficiently wide, and the film is advanced sufficiently slow to scan the entire area of the pictures, a comparatively large portion of the area, more especially at the edges of the pictures is double scanned with the result that the picture as viewed at the television receiver is distorted in that portion wherein superimposed scanning occurs. Another method of scanning also producing distortion consists in employing a scanning disk of known form having spirally located apertures arranged to successively expose differing portions of an attenuated fixed light beam more fully hereinafter described.

It is the prime object of the invention to overcome the difficulty of superimposed scanning by providing a system, or method wherein the pictures are unidirectionally scanned and wherein the scanning light beam is moved continually in one direction across the picture, the beams being so closely approximated that substantially the entire area of the pictures are scanned without superimposition of the scanning spot on any portion thereof.

Another object is to furnish novel apparatus for effecting the aforesaid unidirectional scanning of televised motion pictures.

Another object is to furnish novel scanning apparatus wherein a scanning spot is continuously moved at a uniform rate of travel across a scanned object.

Another object is to furnish novelly formed light beams for scanning televised motion pictures.

Other objects and advantages will appear as the description of the invention progresses, and the novel feature of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the invention, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawing, wherein I have illustrated embodiments of my invention, and, wherein like characters of reference, designate corresponding parts throughout the several views, and in which:—

Figure 3:
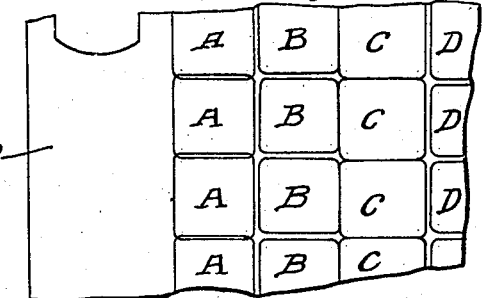
Figure 2:
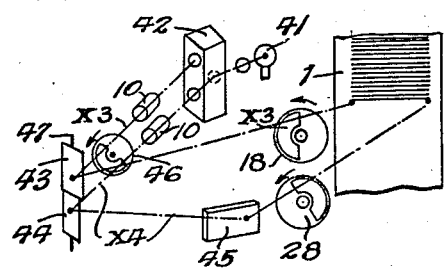

Figure 1 is a diagrammatic view of one embodiment of the invention for scanning motion picture film, and Fig. 2 is also a diagrammatic view of a modified embodiment thereof, and Fig. 3 is a plan view of a motion picture film illustrating the results of a known method of scanning motion picture film.

Fig. 1 is a diagrammatic view of one embodiment of the invention for scanning motion picture film and in which the film 1 having motion picture frames 2 is arranged to be continuously advanced by sprockets or rollers 3—3 relatively to aperture plate or member 4 having aperture 5 arranged transversely of said motion picture frames whereby the motion pictures thereon may be scanned from one side to the other thereof through said aperture.

Optical system 10 is arranged to project a light beam X1 of light rays projected from light source 11 onto vibrating mirror or reflecting member 12 pivotally supported by shaft 13, the armature 14 secured to said mirror being arranged to reciprocate under the influence of alternating current flux generated in magnet yoke 15 by magnet coils 16—16.

A similar optical system 20 is arranged to project a light beam Y1 of the light rays projected from light source 21 onto vibrating mirror or reflecting member 22 pivotally supported by shaft 23, the armature 24 secured to said mirror being arranged to be reciprocated by the influence of alternating current flux generated in magnet yoke 25 by the magnet coils 26—26, the coils 16 and 26 being supplied by high frequency alternating current from alternating current generator 30.

Also energized by generator 30 are synchronous motors 17 and 27 arranged to rotate shutters 18 and 28 having opaque portions 18a and 28a and transparent portions 18b and 28b arranged to intercept the secondary light beams X2 and Y2 during each revolution thereof.

The light sensitive cells 19 and 29 are arranged in multiple in an energized circuit 31 including an amplifying unit 32 associated with the television broadcasting station 33 arranged to broadcast televised motion pictures over aerial 34.

The operation of applicant's system is as follows:—the armatures 14 and 24 vibrate synchronously with the rotation of synchronous motors 17 and 27, in other words, the reciprocating armatures 14 and 24 complete a cycle of two movements during each revolution of said motors 17 and 27. During the movement of armature 14 and mirror 12 supported thereby to project light beam X2 from the left side of aperture 5 to the right side thereof, the transparent portion 18b of shutter 18 registers with said beam whereby the motion picture frame 2 may be scanned from left to right and during the movement of said armature and mirror to project light beam X2 from the right to the left side of aperture 5, the opaque portion 18a of shutter 18 registers with said projected beam thereby cutting off said light beam and preventing the projection thereof onto said aperture.

The operation of armature 24 and synchronous motor 27 in projecting and intercepting the light beam Y2 is similar to that described in connection with armature 14 and motor 17 namely, that as mirror 22 acts to project light beam Y2 from the left to the right over aperture 5, the transparent portion 28b registers with said beam, and during the movement from right to left of said beam over said aperture, the opaque portion 18a registers with said beam. However the operation of armature 14 and 24 and motors 17 and 27 are so synchronized, that, while mirror 12 projects light beam X2 from left to right over aperture 5 the armature 24 and motor 27 acts to project light beam Y2 from the right to the left over said aperture in this manner tending to produce a continuous movement of the beams alternately over said aperture, one of the beams beginning to move to the right from the left side of said aperture simultaneously with the other beam moving to the left from the right side of said aperture, the movement of the both beams to the left however being intercepted by the opaque portions of the shutters whereby only movement thereof to the right is projected onto said aperture in this manner producing unidirectional scanning of the motion picture frames 2.

The width of aperture 5 longitudinally of the film is preferably such that, as one light beam completes its scanning at the right margin of the frames, the portion of the frame previously scanned at the left has just passed or registers with the upper edge of said aperture, in this manner effecting substantially a complete scanning of the area within said frames as said film is advanced.

The broadcasting apparatus of the station 33, with the exception of the scanning device, may be of that form described by Dr. V. Zworykin, in a paper before the Society of Motion Picture Engineers' spring meeting held at Washington, D. C. May 5th, to 8th, inclusive, 1930, or said apparatus may be of any other form wherein the motion pictures to be broadcast are scanned by a beam of light as the film depicting said motion pictures is advanced.

Referring to Fig. 2, light source 41 associated with beam splitting device 42 is arranged to form light beams X3 and X4 directed onto reciprocating member 47 supporting angularly disposed mirrors 43 and 44, the reciprocated portion of beam X4 being reversed in direction of movement by reflecting member 45 whereby the beams X3 and X4 as projected onto film 1 are moved oppositely thereacross. Whereas the shutters 18 and 28 are shown as cancelling the scanning effect of the beams during the movement in one direction thereof across the film, a single shutter as 46 arranged to alternately cancel the movement of said beams may be employed. Should any variation in the light intensity of the source 41 occur, both beams X3 and X4 will be affected alike and therefore film 1 will thus be uniformly scanned. Whereas in Fig. 1 the scanning of the film has been shown as from left to right, in Fig. 2 the scanning is shown as being from right to left on said film.

Referring to Fig. 3, showing how distortion is produced in television broadcasting and receiving wherein the usual scanning disk is employed as hereinbefore mentioned, the areas A, B, C and D represent successively scanned areas, each area also representing successive apertures in the scanning disk, said apertures, due to their comparatively small opening and peculiar location relatively on said disk, being extremely difficult to accurately form as well as accurately allocate. As an example of common errors in forming said apertures, the apertures A are too long longitudinally of the film, therefore overlap and cause super-imposition of light during scanning thereof and therefore distortion as differing areas of the motion pictures have been scanned by each light spot A—A—A. The aperture B is too narrow, or improperly located with respect to A and C and therefore produces an unscanned line between A and B rows producing further distortion. If B is of the correct width but mal-located a superimposed area will be formed between the rows B and C, producing still further distortion. Both "too narrow aperture" and/or mal-location may be caused by a difference of hardness in the metal of the disk on each side of the aperture, the punch making said aperture being strained sidewise thereby also causing shearing and deforming of said aperture as mentioned. The aperture C is assumed to be smaller than the correct size due to being formed exclusively in a hard spot of said disk thereby causing unscanned areas both longitudinally and transversely of the film thereby causing still further distortion of the televised pictures. To overcome the aforesaid dark line distortion caused by unscanned linear areas some disks are employed wherein the apertures are made slightly larger than the theoretical size whereby a double scanned area is formed around each scanned spot as A—D, and whereas the distortion due to dark lines is omitted, the distortion due to double scanning is proportionately increased. In the applicant's method of scanning the aforesaid distortion is overcome, the applicant's apparatus producing scanned linear areas having sharply defined edges, the lines being placed in juxtaposition to one another without superimposition whereby the motion pictures recorded on the film are uniformly scanned and unscanned areas and superimposition of the scanning light are absent thereon.

Whereas a masking member as 4 has been shown as placed adjacent the film 1, it is to be understood that said member may be omitted and a masking member as shown in the applicant's copending application Serial No. 501,025, filed December 9th, 1930, may be interposed in the converging portion of light beam X1 and Y1.

This application forms in part a continuing application of my copending application, Serial No. 501,025, filed Dec. 9, 1930.

Whereas two light sensitive cells 19 and 29 have been shown, only one cell may be employed being so disposed and proportioned whereby both the light beams X2 and Y2 will be projected through the "eye" thereof as film 1 is advanced.

What I claim is:—

1. The method of unidirectionally scanning motion pictures recorded onto motion picture film advanced relatively to a light sensitive cell associated with television broadcasting apparatus which comprises, optically projecting two beams of light through the motion pictures onto the light sensitive cell, and during the projection reciprocating the beams from one margin of the pictures to the other for the scanning thereof, the light beams traveling in opposite direction during their movement from one margin to the other, and during the reciprocal movement of the beams annulling the scanning effect thereof during the movement in one direction thereof without annulling the scanning effect when moving in the opposite direction between the margins whereby the pictures will be unidirectionally scanned without interruption as the film is advanced.

2. Television scanning apparatus for scanning motion picture film, the film being arranged to be advanced relatively to a light sensitive cell associated with television broadcasting apparatus comprising, means for optically projecting a beam of light arranged to pass through the advancing film onto the light sensitive cell for scanning the motion pictures thereon, means for projecting a second beam of light arranged to pass through the advancing film onto the light sensitive cell for also scanning the motion pictures thereon, means positioned in the path of the beams for effecting a reciprocal movement thereof between the margins of the pictures on the film, one of the beams moving oppositely to the other during the reciprocal movement across the pictures, and means positioned in the path of the reciprocating beams arranged to annul the scanning effects thereof when traveling in one direction but not so cancel the scanning effect when traveling in the opposite direction whereby the film is unidirectionally scanned by both films continuously as the film is advanced.

3. Television scanning apparatus comprising, means for advancing a motion picture film having motion pictures recorded thereon, the film being advanced at a uniform rate of travel, a light sensitive cell included in a television broadcasting circuit positioned relatively to the advancing film, means for optically projecting a plurality of light beams, light directing means positioned in the path of the beams arranged to re-direct the light rays thereof through the film onto the light sensitive cell for producing a modulated beam as projected thereonto, means affecting the light directing means for effecting a reciprocation of the beams from one edge of the motion pictures to the other for the scanning thereof as the film is advanced, certain light beams, being reciprocated oppositely to other light beams, and means positioned in the path of the reciprocating beams arranged to intercept the light rays thereof during the portion of the reciprocating cycle the beams move in one direction across the pictures and not so intercept the beams during the portion of the cycle the beams move in the opposite direction whereby the pictures are unidirectionally and uninterruptedly scanned as the film is advanced.

4. In apparatus for scanning motion picture film having a light sensitive cell rearwardly thereof, means for advancing the film continuously at a uniform rate of travel, a light source, means for optically forming the light source into a scanning spot, a device including a light deflector for reciprocating the scanning spot transversely of the film with respect to the advancement thereof, a pulse motor for operating the device, a shutter arranged to periodically intercept the scanning spot during one portion of the reciprocation thereof by the reciprocating means, another pulse motor for operating the shutter, a source of pulsating energy connected to both of the motors, the flow of energy from the source to the motors effecting interception of the scanning spot by the shutter when the reciprocating means is reciprocated in one direction but not intercepted thereby when the reciprocating means is reciprocated in the opposite direction whereby the film is unidirectionally scanned.

5. In apparatus for scanning motion picture film having a light sensitive cell rearwardly thereof, means for advancing the film at a uniform rate of travel, means for projecting a plurality of independent light beams having scanning spots arranged to impinge on the forward side of the film for directing modulated light therethrough onto the cell, means correlated to each light beam for optically reciprocating the scanning spots transversely of the film with respect to the advancement thereof, means synchronously operating the scanning spot reciprocating means for reciprocating the spots in relatively opposite directions of travel, and shuttering means for cancelling the scanning spots at the film during the reciprocation thereof in one direction and not cancelling the spots during the reciprocation thereof in the other direction whereby the film is unidirectionally scanned during the advancement thereof.

6. In apparatus for scanning motion picture film having a light sensitive cell rearwardly thereof, means for advancing the film at a uniform rate of travel, means for projecting a plurality of independent light beams having scanning spots arranged to impinge on the forward side of the film for directing modulated light therethrough onto the cell, means correlated to each light beam for optically reciprocating the scanning spots transversely of the film with respect to the advancement thereof, means synchronously operating the scanning spot reciprocating means for reciprocating the spots in relatively opposite directions of travel, shuttering means for cancelling the scanning spots at the film during the reciprocation thereof in one direction and not cancelling the spots during the reciprocation thereof in the other direction whereby the film is unidirectionally scanned, a mask member positioned forwardly of the film, and a light slit therein parallel to the path of travel of the scanning spots, the slit having a width less than the width of the scanning spots.

7. Apparatus for scanning objects comprising, means for optically forming two beams of light each having a scanning spot portion, means for reciprocating the scanning spot portions over the object for the scanning thereof, the scanning spot portion being reciprocated in parallel planes at the point of contact with the object, one of the beams moving oppositely to the other beam during the reciprocation thereof, means for moving the beams and the object relatively, the plane of movement being disposed angularly with respect to the plane of reciprocation of the beams, and means affecting the beams arranged to cancel the scanning effect of the scanning spot portion during the movement thereof only in one direction whereby the object will be continuously unidirectionally scanned.

8. In apparatus for scanning an object, means for projecting a plurality of continuously illuminated beams of light having scanning spots impinging on the object, means correlated to each for optically reciprocating the scanning spots over the object in relatively opposite directions of travel, shuttering means correlated to each light beam for cancelling the spots during one direction of travel thereof and not cancelling the spots during the opposite direction of travel thereof, and means synchronously operating the optical reciprocating means and the shuttering means for effecting successive unidirectional travel of the scanning spots over the object.

9. In apparatus for scanning an object, means for projecting a plurality of continuously illuminated light beams having scanning spots impinging on the object, means correlated to each light beam for optically reciprocating the scanning spots over the object in relatively opposite planes of travel, shuttering means correlated to each light beam for cancelling the spots during one direction of travel thereof and not cancelling the spots during the opposite direction of travel thereof, means synchronously operating the optical reciprocating means and the shuttering means for effecting successive unidirectional travel of the scanning spots over the film, a mask member positioned in the path of the light beams, and a light slit therein parallel to the plane of travel of the scanning spots, the slit having a width less than the width of the scanning spots.

10. In the art of television the method of scanning an object which involves, optically projecting a plurality of continuously illuminated beams of light, each beam having a scanning spot of similar area arranged to scan the object, optically reciprocating the light beams in opposite directions for reciprocating the scanning spots over the object, during the scanning operation alternately intercepting each light beam for producing unidirectional scanning of the object, and during the scanning operation also moving the object in a plane disposed angularly to the plane of movement of the scanning spots.

OSCAR A. ROSS.